United States Patent
Kusumi

(10) Patent No.: US 11,218,012 B2
(45) Date of Patent: Jan. 4, 2022

(54) SECONDARY BATTERY SYSTEM AND METHOD FOR CONTROLLING CHARGING OF SECONDARY BATTERY

(71) Applicant: Toyota Jidosha Kabushiki Kaisha, Toyota (JP)

(72) Inventor: Hidetoshi Kusumi, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 179 days.

(21) Appl. No.: 16/658,981

(22) Filed: Oct. 21, 2019

(65) Prior Publication Data
US 2020/0127465 A1 Apr. 23, 2020

(30) Foreign Application Priority Data
Oct. 23, 2018 (JP) .............................. JP2018-199125

(51) Int. Cl.
| H02J 7/00 | (2006.01) |
| H02J 7/04 | (2006.01) |
| H01M 10/44 | (2006.01) |
| H01M 10/48 | (2006.01) |
| H01M 10/46 | (2006.01) |
| H01M 10/0525 | (2010.01) |

(52) U.S. Cl.
CPC ............. *H02J 7/007* (2013.01); *H01M 10/44* (2013.01); *H01M 10/46* (2013.01); *H01M 10/48* (2013.01); *H02J 7/0048* (2020.01); *H02J 7/00714* (2020.01); *H02J 7/007194* (2020.01); *H02J 7/04* (2013.01); *H01M 10/0525* (2013.01)

(58) Field of Classification Search
CPC .. H02J 7/007; H02J 7/007194; H02J 7/00712; H02J 7/00714; H02J 7/0048; H02J 7/04; H01M 10/0565; H01M 10/0562; H01M 10/443; H01M 10/44; H01M 10/48; H01M 10/46
USPC .......................................................... 320/134
See application file for complete search history.

(56) References Cited

U.S. PATENT DOCUMENTS

| 5,363,031 | A | * | 11/1994 | Miller | ................... | H02J 7/0078 320/115 |
| 5,387,857 | A | * | 2/1995 | Honda | ................... | H02J 7/0016 320/120 |
| 5,493,199 | A | * | 2/1996 | Koenck | ................... | H02J 7/0071 320/106 |
| 5,640,059 | A | * | 6/1997 | Kammiller | ................ | B60L 3/04 307/66 |
| 5,856,737 | A | * | 1/1999 | Miller | ................... | H01M 10/48 320/152 |

(Continued)

FOREIGN PATENT DOCUMENTS

| JP | 11-341698 A | 12/1999 |
| JP | 2017-103065 A | 6/2017 |

(Continued)

*Primary Examiner* — John T Trischler
(74) *Attorney, Agent, or Firm* — Dinsmore & Shohl LLP

(57) ABSTRACT

An ECU performs processing including the steps of: obtaining a battery temperature TB when a battery is being charged; setting a first target value of the charging current; obtaining an SOC; setting a second target value of the charging current; setting a determined target value and performing current control according to a lower one of the first target value and the second target value.

4 Claims, 4 Drawing Sheets

(56) References Cited

U.S. PATENT DOCUMENTS

| | | | | |
|---|---|---|---|---|
| 6,011,380 A * | 1/2000 | Paryani | B60L 58/13 | 320/132 |
| 6,043,630 A * | 3/2000 | Koenck | H01M 6/505 | 320/128 |
| 6,781,348 B2 * | 8/2004 | Yokohama | H02J 7/0071 | 320/125 |
| 7,888,811 B2 * | 2/2011 | Ichikawa | B60L 3/0046 | 307/9.1 |
| 8,193,778 B2 * | 6/2012 | Morina | H02J 7/0071 | 320/153 |
| 8,274,291 B2 * | 9/2012 | Tsuchiya | G01R 31/367 | 324/426 |
| 8,436,588 B2 * | 5/2013 | Morina | H02J 7/0071 | 320/153 |
| 8,536,809 B2 * | 9/2013 | Kojima | B60L 15/025 | 318/139 |
| 8,664,960 B2 * | 3/2014 | Tsuchiya | G01R 31/367 | 324/426 |
| 8,712,619 B2 * | 4/2014 | Kusumi | H01M 10/443 | 701/22 |
| 8,798,833 B2 * | 8/2014 | Kusumi | B60L 1/003 | 701/22 |
| 8,820,446 B2 * | 9/2014 | Kusumi | B60L 58/21 | 180/65.29 |
| 9,018,902 B2 * | 4/2015 | Kobayashi | H02J 7/00718 | 320/112 |
| 9,126,488 B2 * | 9/2015 | Hiroe | B60L 53/665 | |
| 9,188,491 B2 * | 11/2015 | Pan | G01K 7/01 | |
| 9,197,096 B2 * | 11/2015 | Bhardwaj | H02J 7/04 | |
| 9,233,613 B2 * | 1/2016 | Kusumi | B60L 53/14 | |
| 9,553,468 B2 * | 1/2017 | Bhardwaj | H02J 7/00 | |
| 9,994,109 B2 * | 6/2018 | Taguchi | B60L 50/15 | |
| 10,141,762 B2 * | 11/2018 | Shindo | H01M 4/5825 | |
| 10,305,292 B2 * | 5/2019 | Madhavi | H02J 7/00036 | |
| 10,566,833 B2 * | 2/2020 | Tsai | H02J 7/0068 | |
| 10,703,269 B2 * | 7/2020 | Kusumi | B60L 53/66 | |
| 10,714,956 B2 * | 7/2020 | Gleason | H02J 7/007188 | |
| 10,837,371 B2 * | 11/2020 | Kinoshita | F02D 41/20 | |
| 10,967,753 B2 * | 4/2021 | Kusumi | B60L 53/68 | |
| 11,021,067 B2 * | 6/2021 | Kusumi | B60L 53/60 | |
| 2002/0101218 A1 * | 8/2002 | Koenck | H02J 7/00038 | 320/140 |
| 2003/0184261 A1 * | 10/2003 | Yokoyama | H02J 7/007184 | 320/125 |
| 2009/0001992 A1 * | 1/2009 | Tsuchiya | G01R 31/367 | 324/426 |
| 2009/0015209 A1 * | 1/2009 | Morina | H02J 7/0013 | 320/153 |
| 2009/0315396 A1 * | 12/2009 | Ichikawa | H02J 7/345 | 307/24 |
| 2010/0019729 A1 * | 1/2010 | Kaita | B60L 58/15 | 320/134 |
| 2010/0102778 A1 * | 4/2010 | Otsu | H02J 7/0071 | 320/116 |
| 2011/0109274 A1 * | 5/2011 | Minamiura | H02J 7/00714 | 320/134 |
| 2011/0257914 A1 * | 10/2011 | Tsuchiya | G01R 31/374 | 702/63 |
| 2012/0032505 A1 * | 2/2012 | Kusumi | B60L 58/18 | 307/10.1 |
| 2012/0126750 A1 * | 5/2012 | Morina | H02J 7/0013 | 320/116 |
| 2012/0161719 A1 * | 6/2012 | Kikuchi | H01M 10/121 | 320/150 |
| 2012/0200241 A1 * | 8/2012 | Kojima | H02P 21/06 | 318/139 |
| 2012/0217931 A1 * | 8/2012 | Morina | H02J 7/0013 | 320/116 |
| 2012/0283902 A1 * | 11/2012 | Kusumi | B60L 53/14 | 701/22 |
| 2012/0283903 A1 * | 11/2012 | Kusumi | B60L 58/15 | 701/22 |
| 2013/0002200 A1 * | 1/2013 | Kobayashi | H02J 7/00718 | 320/112 |
| 2013/0035813 A1 * | 2/2013 | Kusumi | B60L 58/16 | 701/22 |
| 2013/0187614 A1 * | 7/2013 | Bhardwaj | H01M 10/443 | 320/134 |
| 2013/0249495 A1 * | 9/2013 | Ang | H02J 7/007192 | 320/134 |
| 2013/0274975 A1 * | 10/2013 | Gregg | B60L 1/02 | 701/22 |
| 2014/0042968 A1 * | 2/2014 | Hiroe | H02J 7/04 | 320/109 |
| 2014/0097676 A1 * | 4/2014 | Kusumi | B60L 58/16 | 307/10.1 |
| 2016/0079777 A1 * | 3/2016 | Bhardwaj | H02J 7/00 | 320/107 |
| 2016/0152150 A1 * | 6/2016 | Taguchi | B60L 50/15 | 307/10.1 |
| 2016/0351928 A1 * | 12/2016 | Hoshi | H01M 8/0491 | |
| 2016/0380315 A1 * | 12/2016 | Weicker | H02J 7/34 | 320/136 |
| 2017/0155127 A1 | 6/2017 | Shindo et al. | | |
| 2017/0366035 A1 * | 12/2017 | Meng | H02J 7/007194 | |
| 2018/0097369 A1 * | 4/2018 | Madhavi | H02J 7/00036 | |
| 2018/0145537 A1 * | 5/2018 | Tsai | H02J 9/04 | |
| 2018/0175662 A1 * | 6/2018 | Zara | H02J 7/007194 | |
| 2019/0006722 A1 * | 1/2019 | Kim | H02J 7/0026 | |
| 2019/0036350 A1 * | 1/2019 | Gleason | H01M 10/6563 | |
| 2019/0070971 A1 * | 3/2019 | Kusumi | B60L 53/60 | |
| 2019/0199108 A1 * | 6/2019 | Hiroe | H02J 7/0024 | |
| 2019/0252906 A1 * | 8/2019 | Kusumi | B60L 53/11 | |
| 2019/0316527 A1 * | 10/2019 | Kinoshita | F02D 29/02 | |
| 2019/0363546 A1 * | 11/2019 | Abe | H02J 7/005 | |
| 2020/0021115 A1 * | 1/2020 | Files | G06F 1/203 | |
| 2020/0177011 A1 * | 6/2020 | Duffy | H01M 10/486 | |
| 2020/0185928 A1 * | 6/2020 | Ha | B60L 58/12 | |
| 2020/0220229 A1 * | 7/2020 | Ishihara | H01M 4/38 | |
| 2020/0343737 A1 * | 10/2020 | Gleason | H02J 7/0047 | |
| 2020/0373778 A1 * | 11/2020 | Gong | H02J 7/007 | |
| 2020/0373779 A1 * | 11/2020 | Arizono | H01M 10/48 | |
| 2020/0395775 A1 * | 12/2020 | Hayayama | H02J 7/0016 | |
| 2020/0403416 A1 * | 12/2020 | Yen | H02J 7/007194 | |
| 2021/0053459 A1 * | 2/2021 | Tsuchiya | B60L 53/305 | |
| 2021/0072323 A1 * | 3/2021 | Gering | H02J 7/0071 | |
| 2021/0078431 A1 * | 3/2021 | Nagatochi | B60L 53/62 | |
| 2021/0101504 A1 * | 4/2021 | Okamoto | H02J 7/00714 | |
| 2021/0107373 A1 * | 4/2021 | Nakamura | B60L 55/00 | |
| 2021/0170903 A1 * | 6/2021 | Tsuchiya | B60L 58/12 | |

FOREIGN PATENT DOCUMENTS

| | | | | |
|---|---|---|---|---|
| WO | WO-2017034275 A1 * | 3/2017 | | B60L 58/26 |
| WO | WO-2019155751 A1 * | 8/2019 | | H01M 10/6571 |

* cited by examiner

SECONDARY BATTERY SYSTEM AND METHOD FOR CONTROLLING CHARGING OF SECONDARY BATTERY

CROSS REFERENCE TO RELATED APPLICATIONS

This nonprovisional application claims priority to Japanese Patent Application No. 2018-199125 filed on Oct. 23, 2018 with the Japan Patent Office, the entire contents of which are hereby incorporated by reference.

BACKGROUND

Field

The present disclosure relates to controlling charging of a secondary battery.

Description of the Background Art

In recent years, a secondary battery including an electrolyte solution, for example, may be used as a power storage device mounted in an environmentally friendly electrically powered vehicle or the like. In such a secondary battery, however, under a low temperature environment, the viscosity of the electrolyte solution increases, migration of ions is suppressed, and thereby internal resistance increases, which may deteriorate the charging/discharging performance of the secondary battery.

To deal with such a problem, for example, Japanese Patent Laying-Open No. 11-341698 discloses a technique of decreasing a charging current as the temperature of a secondary battery including an electrolyte solution decreases, and gradually increasing the charging current as the secondary battery is heated by Joule heat generated inside the battery through energization and the temperature of the secondary battery increases.

SUMMARY

However, when the temperature environment of the secondary battery as described above is a low temperature environment in which the electrolyte solution would be frozen, migration of ions stops completely, and the charging current may not flow. Accordingly, it is necessary to perform charging while suppressing freezing of the electrolyte solution by additionally providing a heater or the like. By using the heater or the like, power from a supply source is consumed for an application other than charging, which may prolong charging time or reduce charging efficiency.

An object of the present disclosure is to provide a secondary battery system and a method for controlling charging of a secondary battery which suppress prolongation of charging time and reduction of charging efficiency under a low temperature environment.

A secondary battery system in accordance with an aspect of the present disclosure includes a secondary battery in which a solid electrolyte is used for migration of ions between a positive electrode and a negative electrode, a charging device configured to charge the secondary battery, and a control device configured to control a charging current of the secondary battery using the charging device. The control device is configured to set a first target value of the charging current such that the first target value increases as a temperature of the secondary battery increases, and the first target value decreases as the temperature of the secondary battery decreases. The control device is configured to set a second target value of the charging current such that the second target value increases as a state of charge (SOC) of the secondary battery decreases, and the second target value decreases as the SOC increases. The control device is configured to control the charging current according to a lower one of the first target value and the second target value.

In the secondary battery in which the solid electrolyte is used for migration of ions between the positive electrode and the negative electrode, even under a low temperature environment in which an electrolyte solution would be frozen, migration of ions is less likely to be suppressed and thus the charging current can flow, when compared with a secondary battery in which an electrolyte solution is used. Accordingly, even when the temperature environment of the secondary battery is the low temperature environment, an appropriate value can be set as the first target value. Further, since the charging current is controlled according to the lower one of the first target value and the second target value which is set based on the SOC of the secondary battery, charging of the secondary battery can be performed according to an appropriate target value based on the SOC in addition to the temperature of the secondary battery. Therefore, charging can be performed even under the low temperature environment without additionally providing a heater or the like. Thereby, prolongation of charging time and reduction of charging efficiency can be suppressed.

In an embodiment, a relation between the temperature of the secondary battery and the first target value has a linear correspondence relation.

In the secondary battery in which the solid electrolyte is used for migration of ions between the positive electrode and the negative electrode, even under a low temperature environment in which an electrolyte solution would be frozen, migration of ions is less likely to be suppressed, when compared with a secondary battery in which an electrolyte solution is used. Thus, the relation between the temperature of the secondary battery and the first target value can have a linear correspondence relation.

Further, in an embodiment, a relation between the SOC and the second target value has a linear correspondence relation.

In the secondary battery in which the solid electrolyte is used for migration of ions between the positive electrode and the negative electrode, the relation between the SOC and the second target value can have a linear correspondence relation both in a high SOC region and in a low SOC region.

A method for controlling charging of a secondary battery in accordance with another aspect of the present disclosure is a method for controlling charging of a secondary battery in which a solid electrolyte is used for migration of ions between a positive electrode and a negative electrode, the method controlling a charging current of the secondary battery during charging. The method for controlling charging includes: setting a first target value of the charging current such that the first target value increases as a temperature of the secondary battery increases, and the first target value decreases as the temperature of the secondary battery decreases; setting a second target value of the charging current such that the second target value increases as an SOC of the secondary battery decreases, and the second target value decreases as the SOC increases; and controlling the charging current according to a lower one of the first target value and the second target value.

The foregoing and other objects, features, aspects, and advantages of the present disclosure will become more apparent from the following detailed description of the present disclosure when taken in conjunction with the accompanying drawings.

DETAILED DESCRIPTION

Figure 1:
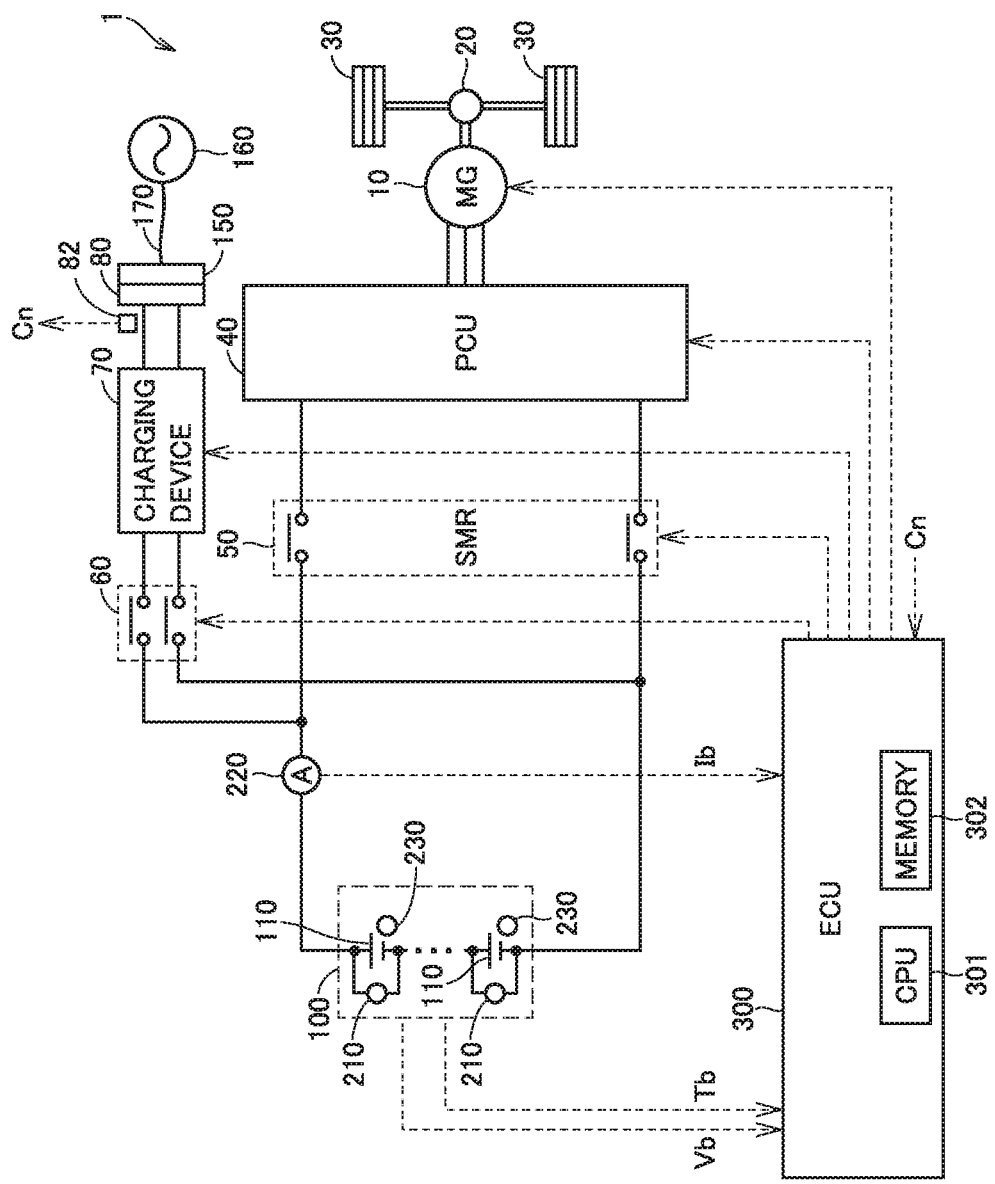
FIG. 1 is a block diagram schematically showing an entire configuration of a vehicle in the present embodiment.

Hereinafter, an embodiment of the present disclosure will be described in detail with reference to the drawings. It should be noted that identical or corresponding parts in the drawings will be designated by the same reference numerals, and the description thereof will not be repeated.

In the following, a vehicle in accordance with the embodiment of the present disclosure will be described, taking the configuration of an electric vehicle as an example.

FIG. 1 is a block diagram schematically showing an entire configuration of a vehicle 1 in the present embodiment. Vehicle 1 includes a motor generator (MG) 10, a motive power transmission gear 20, drive wheels 30, a power control unit (PCU) 40, a system main relay (SMR) 50, a charging relay (hereinafter referred to as CHR) 60, a charging device 70, an inlet 80, a connection switch 82, a battery 100, voltage sensors 210, a current sensor 220, temperature sensors 230, and an electronic control unit (ECU) 300.

MG 10 is a three-phase alternating current (AC) rotating electrical machine, for example, and has a function as an electric motor (motor) and a function as a power generator (generator). An output torque of MG 10 is transmitted to drive wheels 30 via motive power transmission gear 20 configured to include a reduction gear, a differential gear, and the like.

During braking of vehicle 1, MG 10 is driven by drive wheels 30, and MG 10 operates as a power generator. Thereby, MG 10 also functions as a braking device which performs regenerative braking for converting kinetic energy of vehicle 1 into electric power. Regenerative power generated by a regenerative braking force in MG 10 is stored in battery 100.

PCU 40 is a power conversion device configured to bidirectionally convert electric power between MG 10 and battery 100. PCU 40 includes an inverter and a converter which operate based on a control signal from ECU 300, for example.

When battery 100 is discharged, the converter boosts a voltage supplied from battery 100, and supplies it to the inverter. The inverter converts direct current (DC) power supplied from the converter into AC power, and drives MG 10.

In contrast, when battery 100 is charged, the inverter converts AC power generated by MG 10 into DC power, and supplies it to the converter. The converter bucks a voltage supplied from the inverter to a voltage suitable for charging battery 100, and supplies it to battery 100.

In addition. PCU 40 stops charging/discharging by stopping operation of the inverter and the converter based on a control signal from ECU 300. It should be noted that PCU 40 may be configured not to have a converter.

SMR 50 is electrically connected to power lines connecting battery 100 and PCU 40. When SMR 50 is closed (that is, in a conductive state) in response to a control signal from ECU 300, electric power can be transmitted and received between battery 100 and PCU 40. In contrast, when SMR 50 is opened (that is, in a cut-off state) in response to a control signal from ECU 300, electrical connection between battery 100 and PCU 40 is cut off.

CHR 60 is electrically connected between battery 100 and charging device 70. When CHR 60 is closed (that is, in a conductive state) in response to a control signal from ECU 300, and a connector 150 of a system power source 160, which is an external power source, is attached to inlet 80 described later, charging of battery 100 using charging device 70 can be performed. In contrast, when CHR 60 is opened (that is, in a cut-off state) in response to a control signal from ECU 300, electrical connection between battery 100 and charging device 70 is cut off.

Inlet 80 is provided to an exterior portion of vehicle 1, together with a cover (not shown) such as a lid. Inlet 80 has a shape to which connector 150 described later can be mechanically connected. Both inlet 80 and connector 150 have contacts therein. When connector 150 is attached to inlet 80, the contacts are brought into contact with each other, and thereby inlet 80 and connector 150 are electrically connected.

Connector 150 is connected to system power source 160 via a charging cable 170. Thus, when connector 150 is connected to inlet 80 of vehicle 1, electric power from system power source 160 can be supplied to vehicle 1 via charging cable 170, connector 150, and inlet 80.

Charging device 70 is electrically connected to battery 100 via CHR 60, and is electrically connected to inlet 80. In response to a control signal from ECU 300, charging device 70 converts AC power supplied from system power source 160 into DC power, and outputs it to battery 100. For example, when connector 150 is attached to inlet 80, charging device 70 charges battery 100 using the electric power supplied from system power source 160. Such charging using system power source 160 may be referred to below as "external charging".

Battery 100 is a power storage device which stores electric power for driving MG 10. Battery 100 is a rechargeable DC power source, and is composed of a plurality of cells 110 connected in series, for example. Cell 110 is a secondary battery in which a solid electrolyte is used for migration of ions between a positive electrode and a negative electrode, and is a so-called an all-solid-state battery. The all-solid-state battery includes, for example, an all-solid-state lithium ion battery.

Voltage sensor 210 detects a voltage Vb between terminals of each of the plurality of cells 110. Current sensor 220 detects a current Ib input to and output from battery 100. Temperature sensor 230 detects a temperature Tb of each of the plurality of cells 110. Each sensor outputs a detection result thereof to ECU 300.

Connection switch 82 is configured to output an ON signal Cn to ECU 300 when connector 150 is connected to inlet 80, and to stop output of ON signal Cn when connector 150 is disconnected from inlet 80.

ECU 300 includes a central processing unit (CPU) 301, a memory (a read only memory (ROM) and a random access memory (RAM)) 302, and an input/output buffer (not shown). ECU 300 controls each device such that vehicle 1 achieves a desired state, based on a signal received from each sensor and information such as maps and programs stored in memory 302.

Generally, a power storage amount of battery 100 is managed based on the SOC indicating the ratio of a present power storage amount to a full charging capacity, expressed in percentage. ECU 300 has a function of sequentially calculating the SOC of battery 100 based on values detected by voltage sensors 210, current sensor 220, and temperature sensors 230. As a method for calculating the SOC, various known techniques can be adopted, such as a technique using current value integration (coulomb counting), or a technique using estimation of an open circuit voltage (OCV), for example.

During operation of vehicle 1, battery 100 is charged or discharged by the regenerative power or discharging power generated by MG 10. ECU 300 controls output of MG 10 such that MG 10 outputs power for generating a vehicle driving force (requested driving force set according to the accelerator position) or braking force (requested decelerating force set according to the brake pedal depression amount or the vehicle speed) requested from a driver.

In contrast, when vehicle 1 is in a stopped state and connector 150 is connected to inlet 80, ECU 300 turns on CHR 60 and operates charging device 70 to charge battery 100 using the electric power from system power source 160.

For example, ECU 300 continues charging until the SOC of battery 100 reaches an upper limit value which is set beforehand (or set according to the degradation state of battery 100), and terminates charging when the SOC of battery 100 reaches the upper limit value.

When battery 100 mounted in vehicle 1 having the configuration as described above includes a liquid electrolyte (hereinafter referred to as an electrolyte solution) for migration of ions between a positive electrode and a negative electrode, under a low temperature environment, the viscosity of the electrolyte solution increases, migration of ions is suppressed, and thereby internal resistance increases, which may deteriorate the charging/discharging performance of a secondary battery. In particular, when the temperature environment of the secondary battery is a low temperature environment in which the electrolyte solution would be frozen, migration of ions stops completely, and a charging current may not flow. In the following description, a secondary battery including an electrolyte solution may be referred to as a "liquid-based battery".

Figure 2:
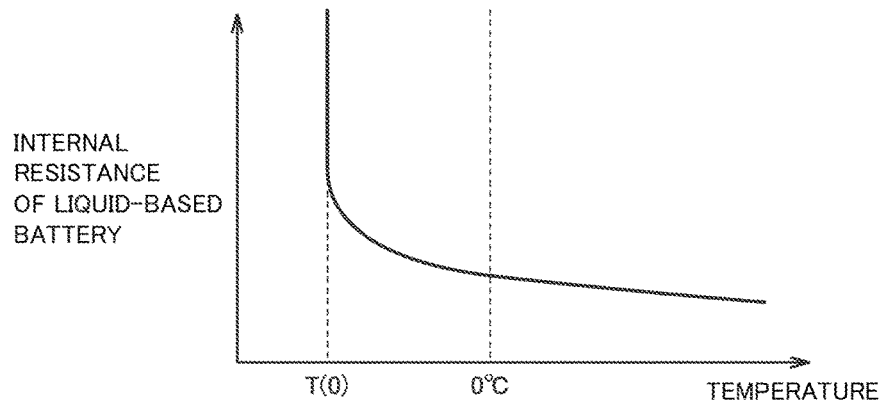
FIG. 2 is a view showing the relation between internal resistance and temperature in a liquid-based battery.

FIG. 2 is a view showing the relation between internal resistance and temperature in a liquid-based battery. The axis of ordinates in FIG. 2 represents the internal resistance (that is, difficulty in migration of ions) of the liquid-based battery. The axis of abscissas in FIG. 2 represents the temperature of the liquid-based battery.

As shown in FIG. 2, under a temperature environment higher than 0° C., the internal resistance and the temperature of the liquid-based battery have a substantially linear relation that the internal resistance decreases as the temperature increases, and the internal resistance increases as the temperature decreases. Further, under a low temperature environment at 0° C. or less, the viscosity of the electrolyte solution increases, and migration of ions is significantly suppressed. Thus, the amount of increase of the internal resistance increases as the temperature decreases from 0° C., and the internal resistance and the temperature have a nonlinear relation. Then, when the temperature of the liquid-based battery decreases to a freezing point T(0) of the electrolyte solution, the electrolyte solution is frozen and migration of ions stops completely. As a result, the charging current may not flow.

Accordingly, in order to charge the liquid-based battery even under such a low temperature environment, it is necessary to perform charging while suppressing freezing of the electrolyte solution by additionally providing a heater or the like. By using the heater or the like, power from a supply source is consumed for an application other than charging, which may prolong charging time or reduce charging efficiency.

Therefore, in the present embodiment, an all-solid-state battery is used as battery 100, and ECU 300 is configured to operate as described below. Specifically, ECU 300 is configured to set a first target value of the charging current such that the value increases as the temperature of battery 100 increases, and the value decreases as the temperature of battery 100 decreases. ECU 300 is configured to set a second target value of the charging current such that the value increases as the SOC of battery 100 decreases, and the value decreases as the SOC of battery 100 increases. ECU 300 is configured to control the charging current according to a lower one of the first target value and the second target value.

In the all-solid-state battery, even under a low temperature environment in which an electrolyte solution would be frozen, migration of ions is less likely to be suppressed and thus the charging current can flow, when compared with a secondary battery in which an electrolyte solution is used. Accordingly, even when the temperature environment of battery 100 is the low temperature environment, an appropriate value can be set as the first target value. Further, since the charging current is controlled according to the lower one of the first target value and the second target value which is set based on the SOC of battery 100, charging of battery 100 can be performed according to an appropriate target value based on the SOC of battery 100 in addition to the temperature of battery 100. Therefore, charging can be performed even under the low temperature environment without additionally providing a heater or the like. Thereby, prolongation of charging time and reduction of charging efficiency can be suppressed, while suppressing deterioration of battery 100.

Figure 3:
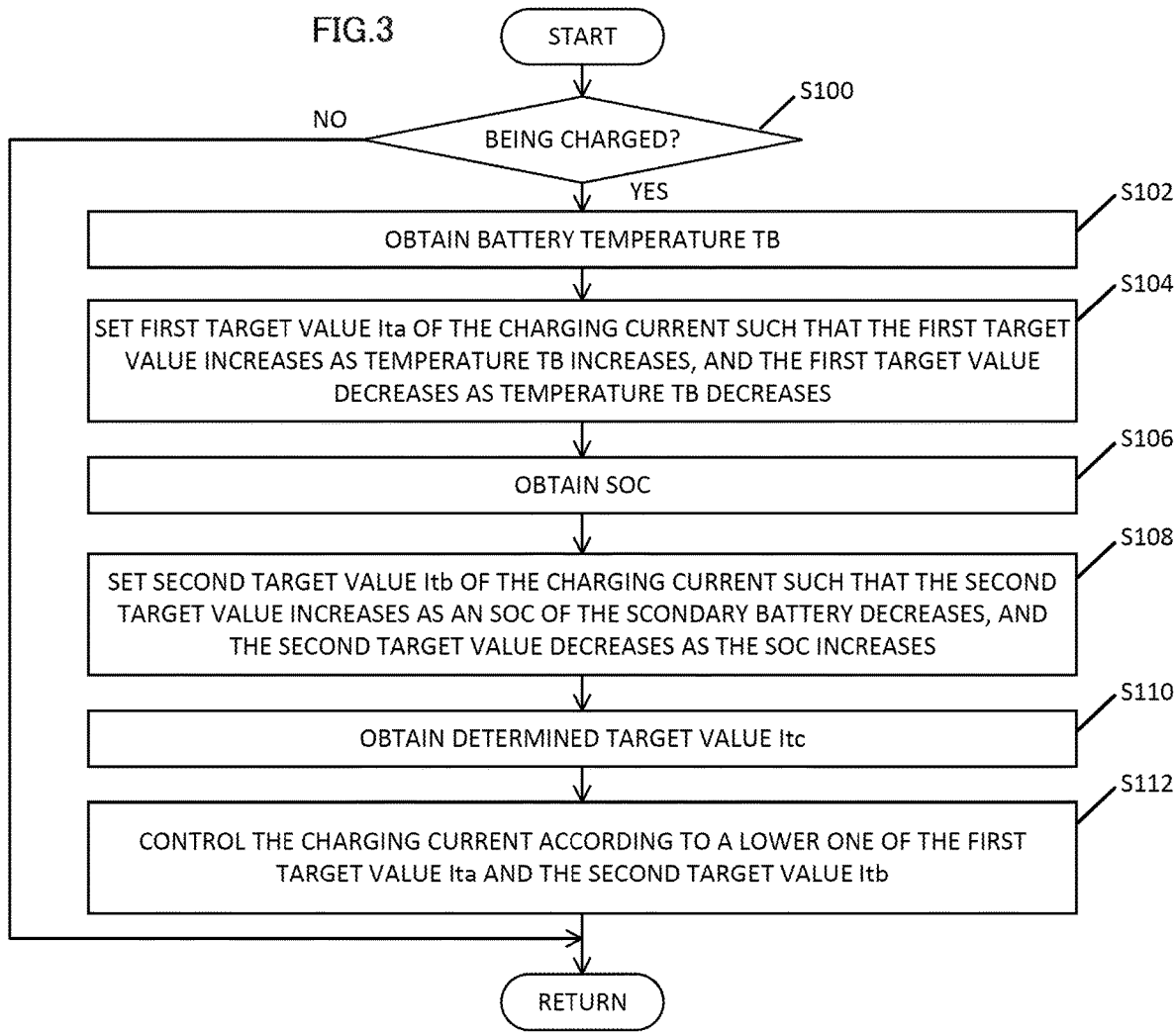
FIG. 3 is a flowchart showing an example of processing performed by an ECU.

In the following, processing for controlling the charging current of battery 100 during external charging, for example, will be described with reference to FIG. 3. FIG. 3 is a flowchart showing an example of processing performed by ECU 300. The processing shown in this flowchart is performed repeatedly at a predetermined processing cycle by ECU 300 shown in FIG. 1.

In step (hereinafter referred to as S) 100, ECU 300 determines whether or not battery 100 is being charged. For example, ECU 300 may determine that battery 100 is being charged when at least one of the following cases is satisfied: a case where ECU 300 is receiving the ON signal from connection switch 82, a case where charging device 70 is running, and a case where a charging current with a value which is more than or equal to a threshold value is flowing to battery 100 based on the current received from current sensor 220. When it is determined that battery 100 is being charged (YES in S100), the processing proceeds to S102.

In S102, ECU 300 obtains a battery temperature 1 TB of battery 100. For example, ECU 300 obtains battery temperature TB based on temperatures Tb of the plurality of cells 110 received from temperature sensors 230. For example, ECU 300 may obtain an average value of temperatures Tb of the plurality of cells 110 as battery temperature TB, or may obtain the lowest temperature of temperatures Tb of the plurality of cells 110 as battery temperature TB.

In S104, ECU 300 sets a first target value Ita of the charging current. Specifically, ECU 300 sets first target value Ita using obtained battery temperature TB of battery 100. ECU 300 sets first target value Ita using obtained battery temperature TB and a predetermined first map. The predetermined first map shows the relation between first target value Ita and battery temperature TB, is adapted through experiments and the like, and is stored in memory 302 of ECU 300 beforehand.

Figure 4:
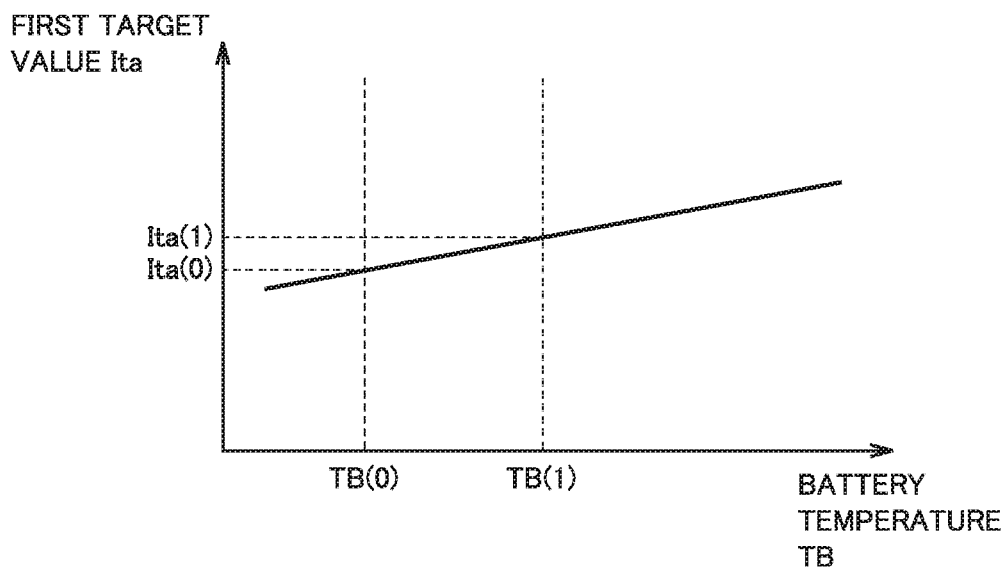
FIG. 4 is a view showing the relation between a first target value and battery temperature.

FIG. 4 is a view showing the relation between first target value Ita and battery temperature TB. The axis of ordinates in FIG. 4 represents first target value Ita. The axis of abscissas in FIG. 4 represents battery temperature TB.

As shown in FIG. 4, the relation between first target value Ita and battery temperature TB is set such that first target value Ita increases as battery temperature TB increases, and first target value Ita decreases as battery temperature TB decreases. As shown in FIG. 4, the relation between first target value Ita and battery temperature TB has a linear correspondence relation.

Accordingly, for example, when battery temperature TB is TB(0), Ita(0) is set as first target value Ita. Further, when battery temperature TB is TB(1) which is higher than TB(0), Ita(1) which is higher than Ita(0) is set as first target value Ita.

Returning to FIG. 3, in S106, ECU 300 obtains the SOC of battery 100. Since the method for estimating the SOC of battery 100 is the same as described above, the detailed description thereof will not be repeated.

In S108, ECU 300 sets a second target value Itb of the charging current. Specifically, ECU 300 sets second target value Itb using the obtained SOC of battery 100. ECU 300 sets second target value Itb using the obtained SOC and a predetermined second map. The predetermined second map shows the relation between second target value Itb and the SOC, is adapted through experiments and the like, and is stored in memory 302 of ECU 300 beforehand.

Figure 5:
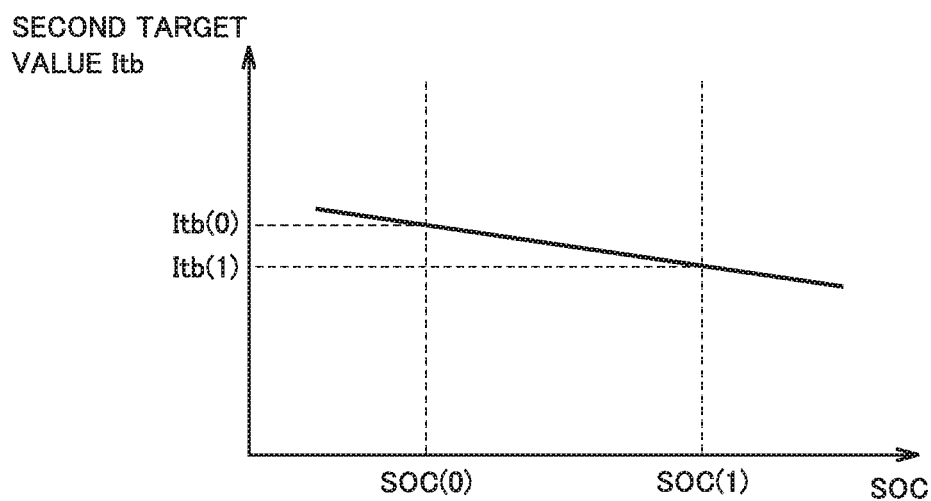
FIG. 5 is a view showing the relation between a second target value and the SOC.

FIG. 5 is a view showing the relation between second target value Itb and the SOC. The axis of ordinates in FIG. 5 represents second target value Itb. The axis of abscissas in FIG. 5 represents the SOC of battery 100.

As shown in FIG. 5, the relation between second target value Itb and the SOC is set such that second target value Itb decreases as the SOC increases, and second target value Itb increases as the SOC decreases. As shown in FIG. 5, the relation between second target value Itb and the SOC has a linear correspondence relation.

Accordingly, for example, when the SOC is SOC(0), Itb(0) is set as second target value Itb. Further, when the SOC is SOC(1) which is higher than SOC(0), Itb(1) which is lower than Itb(0) is set as second target value Itb.

Returning to FIG. 3, in S110, ECU 300 sets a determined target value Itc of the charging current as a final target value of the charging current. Specifically, ECU 300 sets a lower one of first target value Ita set in S104 and second target value Itb set in S108, as determined target value Itc.

In S112, ECU 300 performs current control such that the charging current reaches set determined target value Itc. For example, ECU 300 controls charging device 70 such that the charging current during external charging reaches determined target value Itc.

Operation of ECU 300 based on the structure and the flowchart as described above will be described.

For example, when connector 150 is attached to inlet 80 of vehicle 1 by a user, external charging is performed. Thus, battery 100 is being charged (YES in S100), and then battery temperature TB is obtained (S102). Then, first target value Ita is set using obtained battery temperature TB and the first map (S104).

Further, the SOC of battery 100 is obtained (S106), and second target value Itb is set using the obtained SOC and the second map (S108). The lower one of set first target value Ita and second target value Itb is set as determined target value Itc (S110). Thus, current control is performed such that the charging current reaches determined target value Itc (S112).

As described above, according to the secondary battery system and the method for controlling charging of the secondary battery in accordance with the present embodiment, in an all-solid-state battery, even under a low temperature environment in which an electrolyte solution would be frozen, migration of ions is less likely to be suppressed and thus the charging current can flow, when compared with a liquid-based battery.

Figure 6:
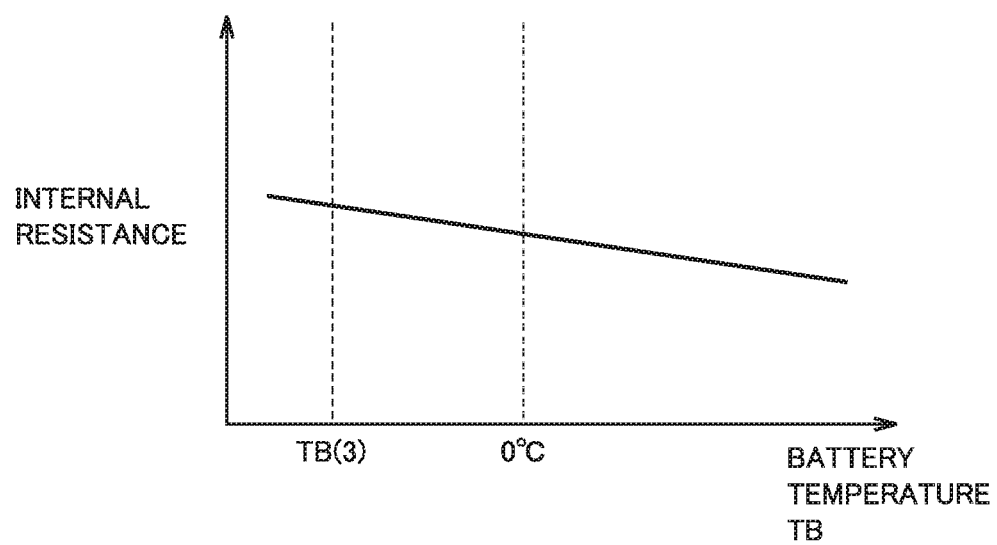
FIG. 6 is a view showing the relation between internal resistance and temperature in a battery which is an all-solid-state battery.

FIG. 6 is a view showing the relation between internal resistance and temperature in battery 100 which is an all-solid-state battery. The axis of ordinates in FIG. 6 represents the internal resistance of battery 100. The axis of abscissas in FIG. 6 represents battery temperature TB of battery 100.

As shown in FIG. 6, the internal resistance and the temperature of battery 100 have a substantially linear relation that the internal resistance decreases as the temperature increases, and the internal resistance increases as the temperature decreases, both under a temperature environment higher than 0° C. and under a low temperature environment at 0° C. or less, unlike the relation between the internal resistance and the temperature in the liquid-based battery shown in FIG. 2. Thus, first target value Ita can be set to have a linear correspondence relation with battery temperature TB in a temperature range assumed based on an operating temperature environment in battery 100, as shown in FIG. 4. Accordingly, even when the temperature environment of battery 100 is the low temperature environment, an appropriate value can be set as first target value Ita. Further, since the charging current is controlled according to the lower one of first target value Ita and second target value Itb which is set based on the SOC of battery 100, charging of battery 100 can be performed according to appropriate determined target value Itc based on the SOC of battery 100 in addition to battery temperature TB of battery 100. Therefore, charging can be performed even under the low temperature environment without additionally providing a heater or the like. Thereby, prolongation of charging time and reduction of charging efficiency can be suppressed. Therefore, it is possible to provide a secondary battery system and a method for controlling charging of a secondary battery which suppress prolongation of charging time and reduction of charging efficiency under a low temperature environment.

Further, the relation between first target value Ita and battery temperature TB of battery 100 can be set to have a linear correspondence relation. Accordingly, it is possible to reduce man-hours for producing the map and reduce computing load, when compared with a case where it has a nonlinear correspondence relation.

Further, the relation between second target value Itb and the SOC of battery 100 can be set to have a linear correspondence relation. Accordingly, it is possible to reduce man-hours for producing the map and reduce computing load, when compared with a case where it has a nonlinear correspondence relation.

In the following, variations will be described.

Although it has been described in the above embodiment that vehicle 1 is an electric vehicle, vehicle 1 may be any vehicle equipped with at least an all-solid-state battery which can be charged using a power generator or an external power source during traveling or during stopping, and vehicle 1 is not particularly limited to an electric vehicle. For example, vehicle 1 may be a hybrid vehicle (including a plug-in hybrid vehicle) equipped with a driving electric motor and an engine.

Further, although it has been described in the above embodiment that battery temperature TB of battery 100 is used to set first target value Ita, temperatures Tb of the plurality of cells 110 may be used to set target values of the charging current corresponding to the cells, and a plurality of set target values may be used to set first target value Ita. For example, ECU 300 may set a minimum value or an average value of the plurality of set target values, as first target value Ita. Alternatively, when a predetermined number of cells constitute a module and a plurality of modules constitute battery 100, temperatures of the plurality of modules may be obtained, the obtained temperatures may be used to set target values of the plurality of modules, and a plurality of set target values may be used to set first target value Ita.

Further, although it has been described in the above embodiment that the first map is used to set first target value Ita and the second map is used to set second target value Itb, a mathematical expression, a table, or the like may be used instead of each map to set first target value Ita or second target value Itb.

Further, although it has been described in the above embodiment that first target value Ita is set based on battery temperature TB and second target value Itb is set based on the SOC of battery 100 while battery 100 is being charged during external charging, first target value Ita may be set based on battery temperature TB and second target value Itb may be set based on the SOC of battery 100 while battery 100 is being charged by regenerative power generated in MG 10.

It should be noted that the variations described above may be entirely or partially combined as appropriate for implementation.

Although the embodiment of the present disclosure has been described, it should be understood that the embodiment disclosed herein is illustrative and non-restrictive in every respect. The scope of the present disclosure is defined by the scope of the claims, and is intended to include any modifications within the scope and meaning equivalent to the scope of the claims.

What is claimed is:

1. A secondary battery system comprising:
   a secondary battery in which a solid electrolyte is used for migration of ions between a positive electrode and a negative electrode;
   a charging device configured to charge the secondary battery; and
   a control device configured to control a charging current of the secondary battery using the charging device,
   the control device being configured to
   set a first target value of the charging current such that the first target value increases as a temperature of the secondary battery increases, and the first target value decreases as the temperature of the secondary battery decreases,
   set a second target value of the charging current such that the second target value increases as an SOC of the secondary battery decreases, and the second target value decreases as the SOC increases, and
   control the charging current according to a lower one of the first target value and the second target value.

2. The secondary battery system according to claim 1, wherein a relation between the temperature of the secondary battery and the first target value has a linear correspondence relation.

3. The secondary battery system according to claim 1, wherein a relation between the SOC and the second target value has a linear correspondence relation.

4. A method for controlling charging of a secondary battery in which a solid electrolyte is used for migration of ions between a positive electrode and a negative electrode, the method controlling a charging current of the secondary battery during charging, the method comprising:
   setting a first target value of the charging current such that the first target value increases as a temperature of the secondary battery increases, and the first target value decreases as the temperature of the secondary battery decreases;
   setting a second target value of the charging current such that the second target value increases as an SOC of the secondary battery decreases, and the second target value decreases as the SOC increases; and
   controlling the charging current according to a lower one of the first target value and the second target value.

* * * * *